United States Patent
Park

(10) Patent No.: US 6,845,103 B1
(45) Date of Patent: Jan. 18, 2005

(54) APPARATUS AND METHOD FOR CONTROLLING INITIALIZATION OF A DMT SYSTEM

(75) Inventor: Hyung Jin Park, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/563,527

(22) Filed: May 3, 2000

(30) Foreign Application Priority Data

Jun. 5, 1999 (KR) ........................................ 1999/20840

(51) Int. Cl.$^7$ .............................................. H04Q 11/02
(52) U.S. Cl. ...................... 370/430; 370/282; 370/252; 375/272
(58) Field of Search ................................ 370/282, 430, 370/248, 252, 465, 480, 401, 278, 352, 437, 235; 375/222, 220, 219, 231, 260, 235, 203

(56) References Cited

U.S. PATENT DOCUMENTS

| | | | |
|---|---|---|---|
| 6,219,378 B1 * | 4/2001 | Wu | 375/231 |
| 6,459,678 B1 * | 10/2002 | Herzberg | 370/203 |
| 6,577,598 B1 * | 6/2003 | Hwang et al. | 370/235 |
| 6,636,525 B1 * | 10/2003 | Davis | 370/437 |

OTHER PUBLICATIONS

ANSI T1.413–1995 Network and Customer Installation Interfaces—ADSL Metallic Interface, Section 12, 1995.*
Chow, DMT–Based ASDL: Concept, Architecture, and Performance. 1994, IEEE, pp. 3/1–3/6.*

* cited by examiner

Primary Examiner—John Pezzlo
(74) Attorney, Agent, or Firm—Fleshner & Kim, LLP

(57) ABSTRACT

An apparatus for controlling initialization of a discrete multi-tone (DMT) system is provided in which a connection between first and second devices is acknowledged by using a plurality of connection acknowledgment tone frequencies to thereby improve the reliability of the activation/acknowledgment procedure. The method includes transmitting a first connection acknowledgment tone signal at a predetermined frequency from the first device to the second device; detecting a first response tone signal transmitted from the second device; transmitting a second connection acknowledgment tone signal to the second device if the first response tone signal is not detected for a predetermined time; and detecting a second response tone signal inputted from the second device to thereby acknowledge a connection to the second device.

20 Claims, 4 Drawing Sheets

APPARATUS AND METHOD FOR CONTROLLING INITIALIZATION OF A DMT SYSTEM

BACKGROUND OF THE INVENTION

1. Field of the Invention

The invention relates to a discrete multi-tone (Dr system and, in particular, to an apparatus and a method for controlling initialization of the DMT system.

2. Background of the Related Art

The DMT scheme, the standard of an Asymmetric Digital Subscriber Loop (ADSL) communication environment, is a technique for performing a high-speed digital data communication at a transmission rate of 32 Kbps ~8 Mbps via an ordinary telephone line. The DMT method has the characteristics of transmitting and receiving data at a frequency band (20 Kbps ~1.104 Mbps) higher than a voice band, and transmitting data by allocating an optimum number of bits according to the Signal-to-Noise Ratio (SNR) of 256 sub-carriers (tones).

FIG. 1 is a schematic diagram illustrating a related DMT system. As illustrated in FIG. 1, the DMT system includes a central office (CO) 10 and remote terminal (RT) 20 connected to the central office 10 via a common communication line 17. The number of remote terminal 20 is variable. The CO 10 is connected to a personal computer (PC), and the CO 10 and the RT 20 include a DMT modem inside, respectively.

The DMT modem 100, as illustrated in FIG. 2, includes a transmitter 15 and a receiver 25. The transmitter 15 includes a transmitting frame processor 15-1 that processes data to be transmitted into signals by frame, a DMT modulator 15-2 that modulates the output of the transmitting frame processor 15-1 to a DMT form, a D/A converter 15-3 that converts the output of the DMT modulator 10-2 into analog signals, and a transmitting filter 154 that filters the output of the D/A converter 15-3 to thereby transmit it to the opposite party 30. In addition, the receiver 25 includes a receiving filter 25-1 that filters signals received from the opposite party 30, an A/D converter 25-2 that converts the output of the receiving filter into digital signals, a DMT demodulator 25-4 that demodulates the output of the A/D converter 25-2, and a receiving frame processor 25-4 that processes the output of the DMT demodulator 25-4 into signals by frame.

The operation of the conventional DMT system will be described as follows with reference to the accompanying drawings. In order for the CO 10 and the RT 20 to transmit and receive data from each other, an operation of initialization for setting a transmission speed and a transmission parameter with respect to the opposite party is performed. That is, as illustrated in FIG. 3 in step S10, either the CO 10 or the RT 20 performs an activation/acknowledgment procedure for recognizing whether or not it is connected with the opposite party. In step S11, when the opposite party is detected, either the CO 10 or the RT 20 performs a transceiver training procedure to tune an equalizer, an echo canceller and a timing recovery block of the local station.

When the above procedures are finished, in step S12 the CO 10 or the RT 20 measures the state of the common communication line 17 and performs a channel analysis process that computes a SNR condition of the common communication line 17 so as to compute the amount of information to be allocated to each transmission channel. In step S13, an exchange procedure is performed that exchanges the amount of transmission computed by the CO 10 and the RT 20 and communication parameters.

The above activation/acknowledgment procedure is performed by the DMT modulator 15-2 of FIG. 2. For example, the DMT modulator 15-2 of the RT 20 transmits a connection acknowledgment tone at a predetermined frequency to the CO 10 via the D/A converter 15-3 and the transmission filter 15. The CO 10 repeatedly detects the connection acknowledgment tone signal for a predetermined time period using a detector, and transmits a response tone signal of a predetermined frequency as an acknowledgment signal to the RT 20 if the connection acknowledgment tone signal transmitted from the RT 20 is detected. As a result, the RT 20 recognizes the connection with the CO 10 based on the reception of the response tone signal. If the RT 20 does not receive a response tone signal from the CO 10 for a certain time, the RT 20 repeatedly performs a procedure of detecting a response tone signal from the CO 10 after transmitting the same connection acknowledgment tone signal to the CO 10.

However, the conventional DMT system has a disadvantage in that a connection trial itself is in vain if the CO or the RT does not detect a response tone signal transmitted from the opposite party in the activation/acknowledgment procedure. Namely, there arises problems that too much noise is generated in the transmission band of a connection acknowledgment tone signal or a response tone signal, and, in the case of a line environment that occupies a particular frequency band and does not affect other frequency bands, communication by the DMT method is not possible.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Accordingly, it is an object of the invention to provide an apparatus and a method for controlling initialization of a DMT system.

It is a further object of the invention to provide an apparatus and a method that guarantees the reliability of a connection recognition.

To achieve the above objects, there is provided an apparatus for controlling initialization of a DMT system for establishing a connection between a first device and a second device according to the invention which includes transmitting means for transmitting a plurality of connection acknowledgment tone signals having different frequencies to the second device at regular time interval, and recognizing means for recognizing a connection with the second device based on whether or not a response tone signal transmitted from the second device in response to one of the plurality of connection acknowledgment tone signals is detected.

To achieve the above objects, there is provided an apparatus for controlling initialization of a DMT system according to the invention which includes a controller that controls and monitors the initialization process; a timer that sets a time limit that detects a response tone signal; a tone signal generator that generates a connection acknowledgment tone signal at a predetermined frequency according to the control of the controller; a DMT modulator that DMT-modulates the connection acknowledgment tone signal outputted from the tone signal generator to thereby output it to the opposite party; a DMT demodulator that DMT-modulates a response tone signal transmitted from an opposite party; and a detector that detects the response tone signal demodulated by the DMT demodulator to thereby output it to the controller.

In addition, to achieve the above objects, there is provided a method for controlling initialization of the DMT system for establishing a connection between a first device and a second device according to the invention which includes transmitting a first connection acknowledgment tone signal at a predetermined frequency from the first device to the second device; detecting whether or not a first response tone signal is inputted from the second device; transmitting a second connection acknowledgment tone signal at a predetermined frequency different from the frequency of the first connection acknowledgment tone signal from the first device to the second device if the first response tone signal is not detected for a predetermined time; and detecting if the second response tone signal is inputted from the second device to thereby acknowledge a connection to the second device.

In addition, to further achieve the above objects, there is provided an apparatus for controlling initialization of a discrete multi-tone (DMT) system for establishing a connection between a first device and a second device comprising a tone signal generator that generates a first connection acknowledgment tone signal at a predetermined frequency for a predetermined period of time, and a detector that detects a first response signal received from the second device in response to the first connection acknowledgment tone signal, wherein if the detector does not detect the first response signal within the predetermined period of time, the tone signal generator generates a second connection acknowledgment tone signal at a predetermined frequency different from the frequency of the first connection acknowledgment tone signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
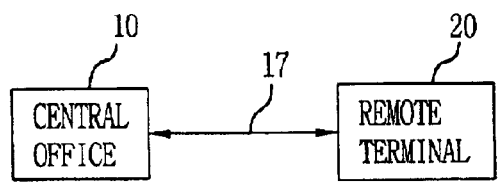
FIG. 1 is a schematic view of a discrete multi-tone (DMT) system.
Figure 2:
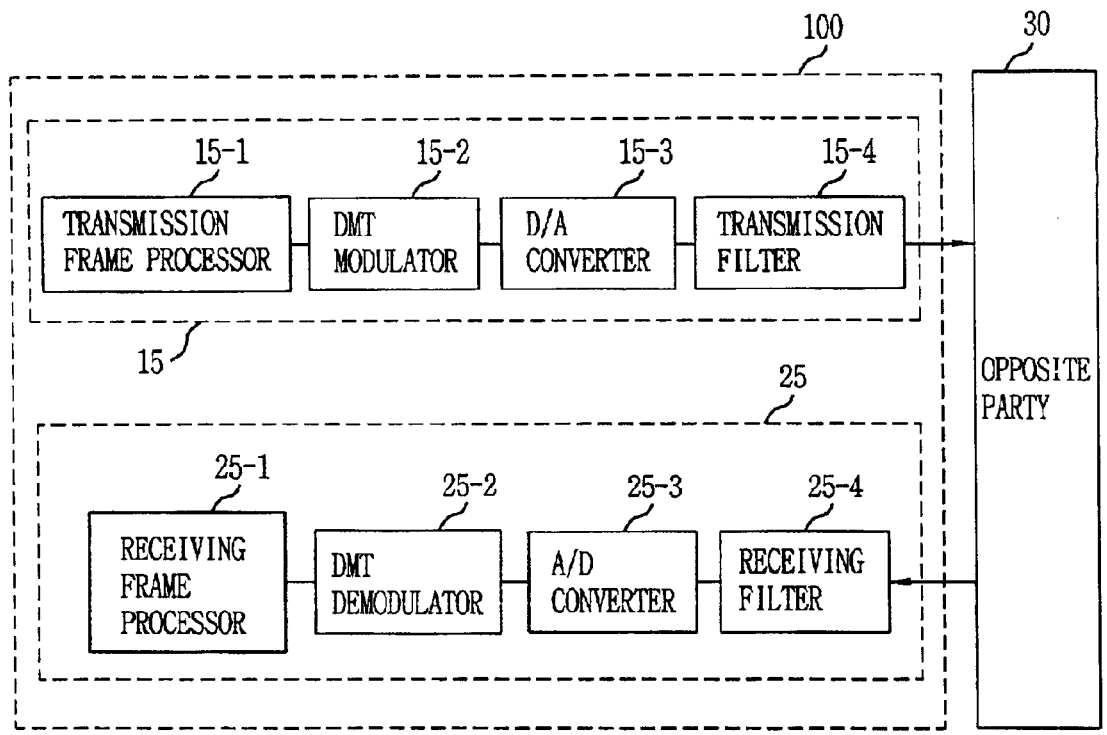
FIG. 2 is a flow chart showing an initialization process of the DMT system of FIG. 1.
Figure 3:
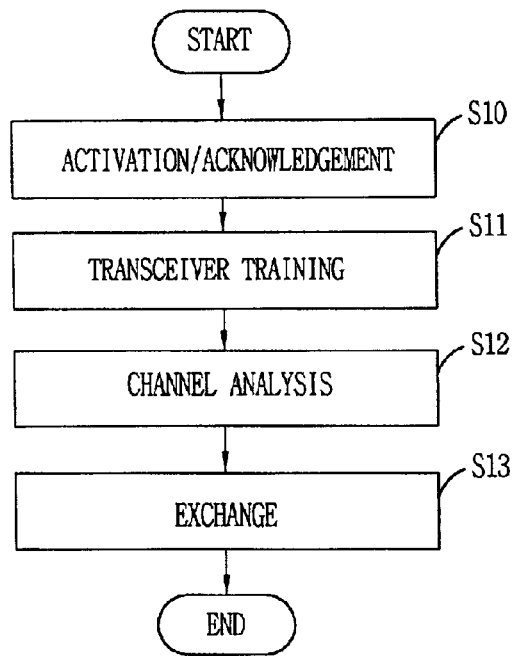
FIG. 3 is a detail diagram of a DMT modem included in a central office (CO) and a remote terminal (RT) of FIG. 1.
Figure 4:
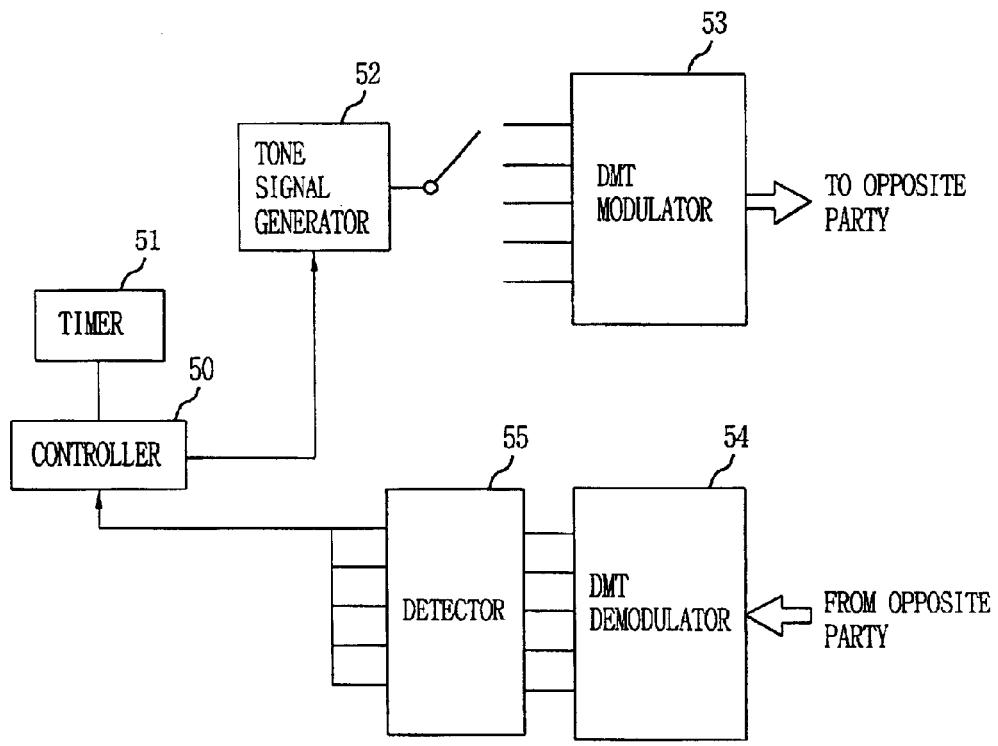
FIG. 4 is a block diagram of an apparatus for controlling initialization of a DMT system according to a preferred embodiment of the invention.

FIG. 4 is a block diagram of an apparatus for controlling initialization of a DMT system according to a preferred embodiment of the invention. As shown in FIG. 4, the apparatus for controlling initialization of the DMT system according to the invention includes a controller 50 that controls and monitors the initialization process and a timer 51 that sets a time limit for detecting a response tone signal. A tone signal generator 52 generates a tone signal at a certain frequency according to the control of the controller 50. A DMT modulator 53 DMT-modulates the tone signal outputted from the tone signal generator 52 to thereby output it to an opposite party and a DMT demodulator 54 DMT-demodulates a response tone signal transmitted from an opposite party. A detector 55 detects the output of the DMT demodulator 54 to thereby output it to the controller 50.

The operation of the apparatus for controlling initialization of the DMT system according to the invention will be described as follows with reference to the accompanying drawings.

The RT 20 transmits a tone signal at a predetermined particular frequency (connection acknowledgment tone frequency), for example, a tone signal having a frequency of 34.5 Khz corresponding to a eighth tone to the CO 10. That is, the tone signal generator 52 of the RT 20 generates a tone signal having a frequency of 34.5 Khz according to the control of the controller 50, and the DMT modulator 53 DMT-modulates the generated tone signal to thereby transmit it to the CO 10. The controller 50 monitors if a response tone signal (response tone frequency) is received, after operating the timer 51.

If the response tone signal transmitted from the CO 10 is detected, the RT 20 recognizes a connection with the CO 10 and performs an initialization process. That is, the DMT demodulator 54 of the RT 20 DMT-demodulates the response tone signal transmitted from the CO 10 and outputs it to the detector 55, and the detector 55 detects a particular response tone signal from the demodulated signal to thereby output it to the control unit 50. Therefore, if a desire response tone signal is detected, the controller 50 disables the timer 51 and performs the next of the initialization processes, that is, a transceiver training procedure, a channel analysis procedure and an exchange procedure one after another.

However, if the response tone signal is not detected even when exceeding the threshold of the timer 51, the RT 20 transmits another tone signal at a different frequency to the CO 10 and enables the timer 51. In the case that no response tone signal is detected from the CO 10 even after performing such an operation n-times, the RT 20 considers that it is disconnected with the CO 10 and repeats the whole process.

Figure 5:
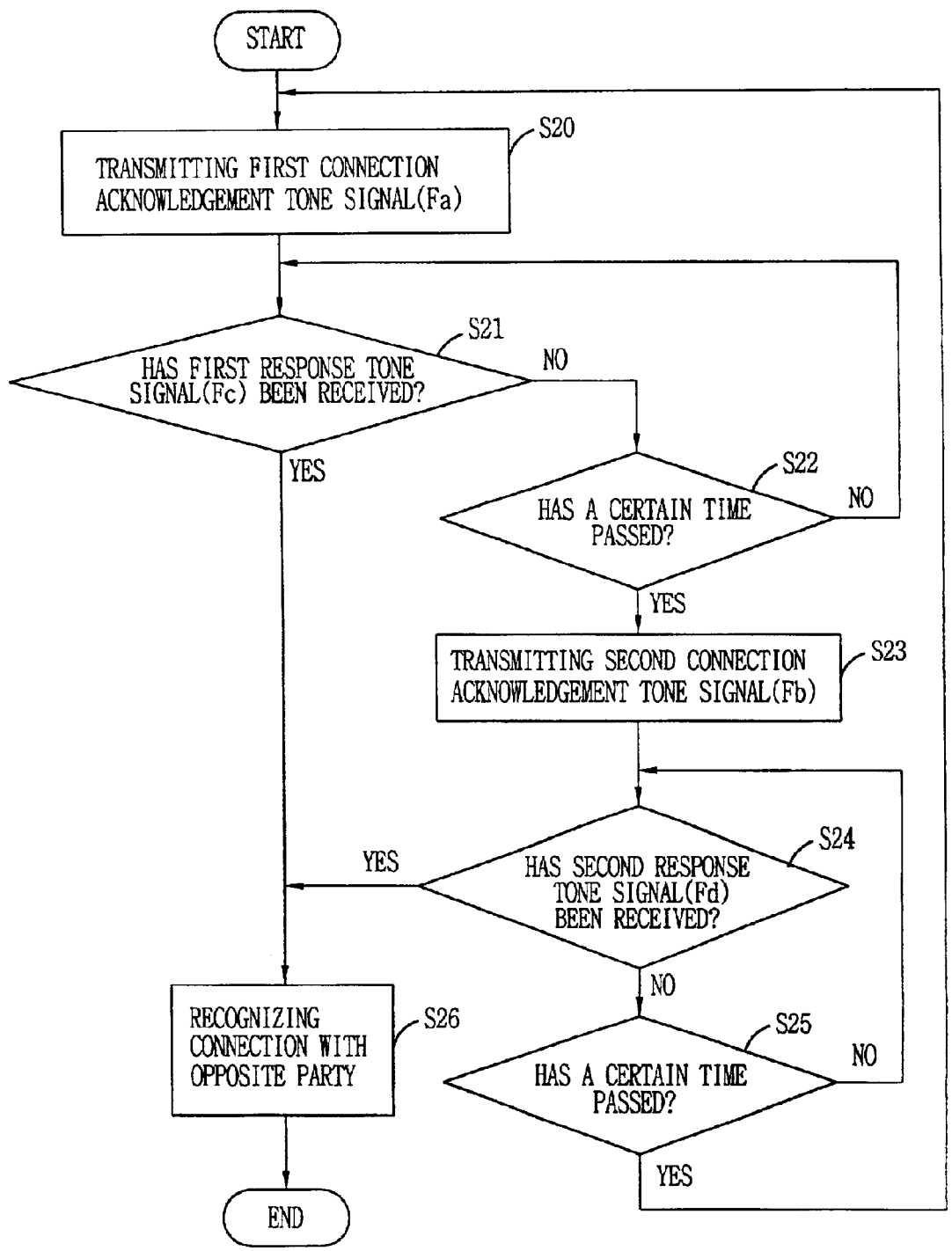
FIG. 5 is an operation flow chart showing an operation of the RT in FIG. 4.
Figure 6:
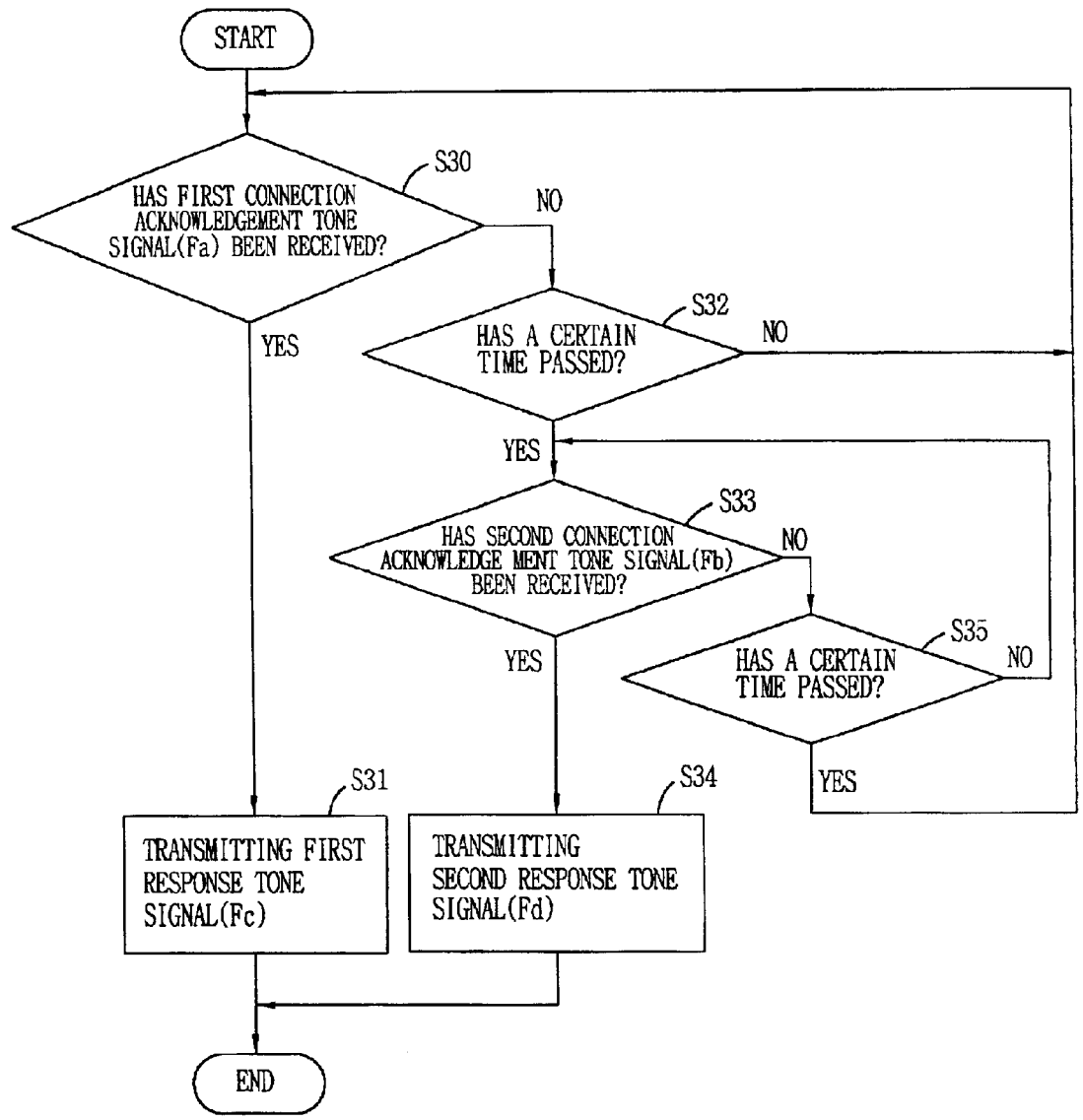
FIG. 6 is an operation flow chart showing an operation of the CO in FIG. 4.

The activation/acknowledgment procedure will be described in detail as follows with reference to the flow charts of FIGS. 5 and 6.

First, the RT 20 transmits a regulated first connection acknowledgment tone signal at a frequency (Fa) to the CO 10 in step S20, and checks if a first response tone-signal (Fc) is received from the CO 10 in step S21. If the first response tone signal (Fc) is received from the CO 10, the RT 20 recognizes a connection with the CO 10 and proceeds to the next initialization step (transceiver training) in step S26. However, if the first response tone signal (Fc) is not detected, it is checked if a certain time has passed in step S22.

As a result of the check, if the first response tone signal (Fc) is not detected for a certain time, the RT 20 transmits a second connection acknowledgment tone signal (Fb) at a different frequency to the CO 10 in step S23 and checks if a second response tone signal (Fd) corresponding to the second connection acknowledgment tone signal (Fb) is received from the CO 10 in step S24. If the second response tone signal (Fd) is received from the CO 10, the RT 20 proceeds to the next initialization step (transceiver training). However, if the second response tone signal (Fd) is not received for a certain time in step S25, the RT 20 considers that it is not connected with the CO 10 and returns to step S20 transmitting a first connection acknowledgment tone signal (Fa).

The CO 10 checks if a first connection acknowledgment tone signal (Fa) is received from the RT 20 for a certain time in step S30. If the first connection acknowledgment signal (Fa) is received, the CO 10 transmits a first response tone signal (Fc) as a receipt acknowledgment signal to the RT 20 in step S31. If the first connection acknowledgment tone signal (Fa) is not detected after a certain time, the CO 10 proceeds to steps S32 and S33 detecting a receipt of a second connection acknowledgment signal F(b).

If the second connection acknowledge tone signal F(b) is received for a certain time received, the CO 10 transmits a second response tone signal (Pd) as a receipt acknowledgment signal to the RT 20 in step S34. If the second connection acknowledgment tone signal (Fb) is not detected after a certain time in step S35, it returns to step S30 for thereby performing the activation/acknowledgment procedure again.

As a result, the CO 10 or RT 20 can recognize a connection with the opposite party by detecting the second connection acknowledgment tone signal even if a noise is generated in the frequency band of the first connection acknowledgment tone signal. Here, each connection acknowledgment tone signal is set to have a sufficient interval in consideration of continuously occupying a certain band of a certain size.

In addition, although the invention has been described using as an example first and second connection acknowledgment signals having different frequencies, more than two connection acknowledgment signals having different frequencies may be used if needed to thereby increase the reliability of a connection acknowledgment. In such a case, a connection with the opposite party is acknowledged by the first connection acknowledgment tone signal, while the signals thereafter including the second connection acknowledgment tone signal are used as carrier signals.

As described above, the invention prevents a connection trial from failing due to frequency characteristics and noises, thus improving the reliability of a connection acknowledgement by performing the activation/acknowledgment procedure using a plurality of connection acknowledgment tone signals at different frequencies.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. In a discrete multi-tone (DMT) system for establishing a connection between a first device and a second device, an apparatus for controlling initialization of the DMT system, comprising:

transmitting means for transmitting a plurality of connection acknowledgment tone signals having different frequencies from the first device to the second device at regular time intervals; and recognizing means for recognizing a connection with the second device based on whether or not a response tone signal transmitted from the second device in response to one of the plurality of connection acknowledgment tone signals is detected, wherein the transmitting means comprises timer means for setting a time limit for detecting a response tone signal, tone signal generator means for generating a first connection acknowledgment tone signal at a predetermined frequency according to the control of the controller, and wherein the tone signal generator means outputs a second connection acknowledgment tone signal at a predetermined frequency different from the frequency of the first connection acknowledgment tone signal according to the control of the controller if the first response tone signal is not received from the at least one remote terminal within the time limit set by the timer means.

2. The apparatus of claim 1, wherein the second connection acknowledgment tone signal outputted from the tone signal generator means is used as a carrier signal if the first response tone signal is received from the at least one remote terminal within the time limit set by the timer means.

3. An apparatus for controlling initialization of a discrete multi-tone (DMT) system, comprising:

a controller that controls and monitors the initialization process;

a timer that sets a time limit for detecting a response tone signal;

a tone signal generator that generates a plurality of connection acknowledgment tone signals of different frequencies according to the control of the controller;

a DMT modulator that DMT-modulates the connection acknowledgment tone signals outputted from the tone signal generator;

a DMT demodulator that DMT-demodulates a respective response tone signal transmitted from an opposite party in response to one of the plurality of connection acknowledgment tone frequencies; and a detector that detects the response signal demodulated by the DMT demodulator, wherein the tone signal generator outputs a first connection acknowledgment tone signal of a predetermined frequency for a time limit set by the timer and then outputs a second connection acknowledgment signal at a predetermined tone frequency different from the frequency of the first connection acknowledgment tone signal according to the control of the controller if the first response tone signal is not received from an opposite party within the time limit set by the timer.

4. The apparatus of claim 3, wherein the second connection acknowledgment tone signal outputted from the tone signal generator is used as a carrier signal if the first response tone signal is received from an opposite party within the time limit set by the timer.

5. In a discrete multi-tone (DMT) system for establishing a connection between a first device and a second device, a method for controlling initialization of the DMT system, comprising:

transmitting a first connection acknowledgment tone signal at a predetermined frequency from the first device to the second device; and if a first response tone signal corresponding to the first connection acknowledgment tone signal is not received from the second device within a predetermined time limit after transmitting the first connection acknowledgment tone signal to the second device, transmitting a second connection acknowledgment tone signal at a predetermined frequency different from the frequency of the first connection acknowledgment tone to the second device to thereby acknowledge a connection with the second device.

6. The apparatus according to claim 5, wherein the first and second devices are a central office and at least one remote terminal.

7. The method of claim 5, further comprising repeatedly performing the steps of claim 5 if a second response tone signal corresponding to the second connection acknowledgment tone signal is not detected within a predetermined time.

8. In a discrete multi-tone (DMT) system for establishing a connection between a first device and a second device, a method for controlling initialization of the DMT system, comprising:

transmitting a first connection acknowledgment tone signal at a predetermined frequency from the first device to the second device;

detecting a first response tone signal transmitted from the second device in response to the first connection acknowledgment tone signal for a predetermined period of time;

transmitting a second connection acknowledgment tone signal of a predetermined frequency different from the frequency of the first connection acknowledgment tone signal to the second device if the first response tone signal is not detected within the predetermined period of time; and detecting a second response tone signal transmitted from the second device in response to the second connection acknowledgment tone signal for a predetermined period of time.

9. The method of claim 8, wherein the first and second devices are a central office and at least one remote terminal.

10. The method of claim 8, further comprising repeating the step of transmitting the first connection acknowledgment tone signal to the second device if the second response tone signal is not detected within the predetermined period of time.

11. The method of claim 8, further comprising using the second connection acknowledgment tone signal as a carrier signal when the first response tone signal is detected within the predetermined period of time.

12. The method of claim 8, wherein if the first or second response tone signal is detected, it is acknowledged that a connection with the at least one remote terminal is established.

13. The method of claim 8, wherein the at least one remote terminal detects the first connection acknowledgment tone signal for a predetermined period of time, and transmits the first response tone signal if the first connection acknowledgment tone signal is detected or detects the second response acknowledgment tone signal if the first connection acknowledgment tone signal is not detected.

14. The method of claim 13, wherein the at least one remote terminal transmits the second response tone signal if the second connection acknowledgment tone signal is received within a predetermined period of time, or returns to detecting the first connection acknowledgment tone signal if the second connection acknowledgment tone signal is not detected.

15. An apparatus for controlling initialization of a discrete multi-tone (DMT) system for establishing a connection between a first device and a second device, comprising:

a tone signal generator of a first device that generates a first connection acknowledgment tone signal at a predetermined frequency for a predetermined period of time; and a detector that detects a first response signal received from the second device in response to the first connection acknowledgment tone signal, wherein if the detector does not detect the first response signal within the predetermined period of time, the tone signal generator generates a second connection acknowledgment tone signal at a predetermined frequency different from the frequency of the first connection acknowledgment tone signal.

16. The apparatus according to claim 15, wherein the first and second devices are a central office and at least one remote terminal.

17. The apparatus according to claim 16, wherein if the detector does not detect a second response signal received from the second device in response to the second connection acknowledgment tone signal within a predetermined period of time, the tone signal generator generates the first connection acknowledgment tone signal again.

18. The apparatus according to claim 17, further comprising:

a timer for setting time periods for detecting the first and second response tone signals, respectively.

19. The apparatus according to claim 17, further comprising:

a controller that controls and monitors the initialization process, wherein the tone signal generator generates the first and second connection acknowledgment tone signals according to the control of the controller.

20. The apparatus according to claim 15, further comprising:

a DMT modulator that DMT-modulates the first and second acknowledgment tone signals outputted from the tone signal generator; and a DMT demodulator that DMT-demodulates the first and second response tone signals of the DMT form transmitted from the second device.

* * * * *